United States Patent
Hijazi et al.

(10) Patent No.: US 10,802,560 B2
(45) Date of Patent: Oct. 13, 2020

(54) MULTI-POWER INPUT PORT POWER CONTROL

(71) Applicant: Dell Products L.P., Round Rock, TX (US)

(72) Inventors: Mohammed Hijazi, Austin, TX (US); Geroncio O. Tan, Austin, TX (US); Merle J. Wood, III, Round Rock, TX (US); Marcin Nowak, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 288 days.

(21) Appl. No.: 15/959,028

(22) Filed: Apr. 20, 2018

(65) Prior Publication Data
US 2019/0324510 A1 Oct. 24, 2019

(51) Int. Cl.
*G06F 1/26* (2006.01)
*G06F 1/16* (2006.01)
*H02J 7/00* (2006.01)

(52) U.S. Cl.
CPC .......... *G06F 1/266* (2013.01); *G06F 1/1613* (2013.01); *H02J 7/00* (2013.01)

(58) Field of Classification Search
CPC .......... G06F 1/1613; G06F 1/266; H02J 1/10; H02J 2207/40; H02J 7/00
See application file for complete search history.

(56) References Cited

U.S. PATENT DOCUMENTS

| | | | |
|---|---|---|---|
| 6,181,029 B1* | 1/2001 | Berglund | H02J 9/062 307/66 |
| 2011/0087910 A1* | 4/2011 | Lambert | G06F 1/263 713/323 |
| 2016/0282894 A1* | 9/2016 | Hazani | H04L 12/10 |
| 2019/0319545 A1* | 10/2019 | Wang | G06F 1/266 |

* cited by examiner

*Primary Examiner* — Terrell S Johnson
(74) *Attorney, Agent, or Firm* — Norton Rose Fulbright US LLP (57) ABSTRACT

An information handling system with multiple power input ports, such as USB ports, capable of receiving power from external power supplies may control power received from the power supplies. A first controller may detect a first power supply coupled to a first power input port of the system and may allow power to flow from the external power supply to the system. Any additional power supplies detected by controllers may be blocked from providing power to the system while the first power supply is providing power.

20 Claims, 8 Drawing Sheets

MULTI-POWER INPUT PORT POWER CONTROL

FIELD OF THE DISCLOSURE

The instant disclosure relates to power input control. More specifically, portions of this disclosure relate to power input control in information handling systems having multiple power input ports.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be equipped with ports for coupling to external devices, such as power adaptors, batteries, external hard drives, flash drives, external speakers, and the like. Information handling systems may deliver power to and/or receive power from external devices coupled to ports.

Some ports, such as certain universal serial bus (USB) ports, are capable of both providing power from the information handling system to connected devices and receiving power from connected devices to power the information handling system. This dual functionality can provide a variety of benefits such as smaller form factor and reduced cost of the information handling system because a single port can be used to connect to both power consuming and power delivering external devices.

Challenges may arise when a system incorporates multiple ports capable of receiving power from external sources. For example, if multiple external power supplies are coupled to ports simultaneously, reverse current and or cross-conduction may damage the ports and the connected devices. In order to prevent damage, costly and large external power negotiation hardware circuits may be included to prevent the information handling system from accepting power from multiple ports simultaneously.

Shortcomings mentioned here are only representative and are included simply to highlight that a need exists for improved information handling systems, particularly for power input control in information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system may address problems that arise from multiple connected power supplies by accepting power input from a single external power source while blocking power input from any remaining power sources using a hardware arbitration scheme. The arbitration scheme may prevent or reduce cross-conduction between multiple power sources coupled to information handling system. For example, when a controller of a first power input port, such as a first USB port, of an information handling system detects a power source coupled to the first power input port, it may cause controllers of any additional power input ports, such as USB ports, to block any power received from external power sources coupled to the additional power input ports while allowing power from the external power source coupled to the first power input port to be delivered to the information handling system. Accepting power from a single power source coupled to a power input port, while blocking power received from any additional external power sources can prevent cross-conduction and reverse conduction thereby preventing damage to the power input ports, devices coupled to the power input ports, and other information handling system components. Further, use of power input port controllers to allow power from a single power source coupled to a power input port may remove the need for costly and expansive dedicated hardware circuitry to negotiate power delivery, which reduces cost, reduces power consumption, and reduces device form factor.

An information handling system may include multiple power input ports capable of receiving power from connected power sources. Power input ports may, for example be USB ports such as USB-C ports, Thunderbolt ports, barrel jack DC input ports, and other ports capable of receiving power from connected power sources. The power input ports, may, for example, be USB-C ports capable of receiving and sourcing power and simultaneously transmitting and receiving data. Each port may be coupled to a controller, such as a power delivery (PD) controller for controlling power flow through the power input port, such as by negotiating a power and data profile with a device connected to the port. For example, the system may include a first power input port coupled to a first controller and a second power input port coupled to a second controller. The first controller may be configured to block power received at the first power input port when the information handling system is receiving power from a power source coupled to the second power input port, while the second controller may be configured to block power received at the second power input port when the information handling system is receiving power from a power source coupled to the first power input port. For example, the first controller may be configured to toggle open a first switch coupled between the first power input port and the information handling system to block power received at the first power input port. Likewise, the second controller may be configured to toggle open a second switch coupled between the first power input port and the information handling system to block power received at the second power input port. The information handling system may further include a third power input port coupled to a third controller, where the third controller is configured to block power received at the second power input port and the first power input port while the information handling system is receiving power from a power source coupled to the third power input port and the first and second controllers are configured to block power received at the third power input port while the system is receiving power from power sources coupled to their respective ports. Thus, the system may be configured to accept power from a single power input port while blocking power received at any additional power input ports. For example, the system may be configured to accept power on a first-come first-serve basis where a first port to accept power will cause any other ports to ports to block power from being received into the system.

In one embodiment, a controller may include one or more voltage output indicators and one or more voltage output override indicators. These indicators may be logic signals to convey information to other port controllers or other circuitry in an information handling system. The voltage output indicators may indicate when power is being delivered from a port or when power is about to be delivered from a port. The voltage output override indicators may indicate when a power supply is already connected and other ports should reject connection of additional power sources. In order to block power received at the second power input port when the system is receiving power from an external power source, a voltage output indicator of the first controller may be coupled to a voltage output override indicator of the second controller. Likewise, a voltage output indicator of the second controller may be coupled to a voltage output override indicator of the first controller. The first controller may be configured to apply a voltage to its voltage output indicator upon detection of a power supply coupled to the first power input port. The first controller may wait a predetermined period of time after applying the voltage to its voltage output indicator before supplying power from the power supply coupled to the first power input port to the information handling system. Likewise, the second controller may be configured to apply a voltage to its voltage output indicator upon detection of a power supply coupled to the second power input port and to wait a predetermined period of time after applying the voltage to its voltage output indicator before supplying power from the power supply coupled to the second power input port to the information handling system. In some embodiments, the first and second controllers may wait a randomized period of time after detecting a power source coupled to their respective power input ports before applying the voltage to their respective voltage output indicators.

The first and second controllers may output power to a charger for charging a battery of the information handling system. The charger may additionally or alternatively output power to an embedded controller, to one or more voltage regulators, and/or to one or more components of the information handling system.

The first and second controllers may be configured to provide a minimum power level necessary to boot one or more power control components, such as an embedded controller, of the information handling system. For example, if the system is powered down and a power source is connected to each of the first and second power input ports, power will be provided from one of the ports to one or more power control components, such as an embedded controller, to boot the power control components and initialize full power control capabilities. In particular, if a battery of the system is dead or missing, a minimum power level may be necessary to boot the power control components. Once the power control components have booted, the first and second controllers may allow the power control components to control power received from external devices coupled to the first and second power input ports. Power can be provided from a single source to initialize components responsible for providing power input control during booted system operation so that the components can boot without allowing cross-conduction or reverse current flow while the system is booting.

Power input via power input ports can be controlled to prevent cross-conduction and reverse current flow by accepting power from a single port at any given time. For example, a first controller may detect a power source coupled to a first power input port. The first controller may then provide power from the power source coupled to the first power input port to an information handling system. While the first controller is providing power to the information handling system, a second controller may block power received at a second power input port from entering the system.

To provide power to the information handling system, the first controller may apply a voltage to a voltage output indicator of the first controller. The voltage output indicator may be coupled to a voltage output override indicator of the second controller. When a predetermined period of time has passed following application of the voltage, the first controller may allow power to flow from the power source coupled to the first power input port to the information handling system. For example, power may flow from the power source, through the first power input port, through the controller, and to a charger, one or more controllers, and/or one or more voltage regulators of the information handling system. The first controller may wait for a randomized period of time after detecting a power source coupled to the first power input port before applying the voltage to the voltage output indicator.

If an external power source is connected to the second power input port, a voltage may be applied to a voltage output indicator of the second controller and detected at a voltage output override indicator of the first controller. If the voltage is detected at the voltage output override indicator of the first controller after the first controller has detected a power source coupled to the first power input port but before the first controller has applied a voltage to its voltage output indicator, the first controller may block power from flowing from the power source coupled to the first power input port to the information handling system. If the first controller detects a voltage at its voltage output override indicator while it is applying a voltage to its voltage output indicator, prior to the passage of the predetermined period of time, it may remove the voltage from its voltage output indicator. The first controller may then determine a randomized period of time and wait for the determined period of time to pass. If the first controller detects a voltage at its voltage output override indicator prior to the passage of the randomized period of time, it may prevent power from flowing from the power source coupled to the first power input port to the information handling system. The randomized period of time can prevent a continuous conflict between the first and second controllers if both apply a voltage to their respective voltage output indicators during the same period of time. If the randomized period of time passes and no voltage is detected at its voltage output override indicator, the first controller may re-apply the voltage to its voltage output indicator, and, once the predetermined period of time has passed, allow power to flow from the power source coupled to the first power input port to the information handling system.

An information handling system may include first and second controllers for performing the method described above. For example, a controller of the information handling system coupled to a first power input port may be configured to detect a power source coupled to the first power input port, direct a second controller to block power received at the second power input port from entering the system while power is being provided to the system from the power source coupled to the first power input port, and provide power from the power source coupled to the first power input port to the information handling system.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
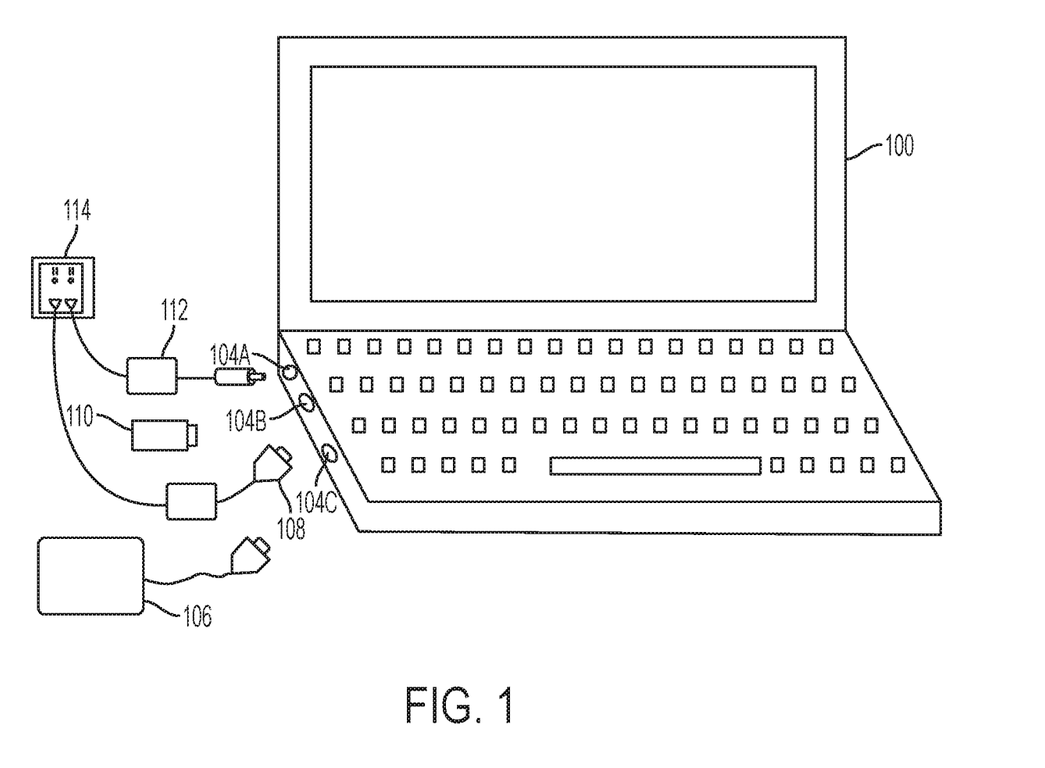
FIG. 1 is a perspective view of an information handling system with multiple ports for coupling to external devices according to some embodiments of the disclosure.

Information handling systems may include ports for coupling to external devices. An example information handling system 100 with an array of external devices is illustrated in FIG. 1. An information handling system 100 may include multiple ports 104A-C. For example, an information handling system may contain barrel power connector ports, such as port 104A, USB-C ports such as ports 104B-C, or other ports, such as USB-A, Thunderbolt, mini-display and other ports for coupling external devices to the information handling system 100. Some ports, such as USB-C ports 104B-C may be capable of both receiving power from external devices and providing power to external devices. Other ports, such as USB 2.0 ports, may be capable of delivering power to external devices, while still other ports, such as barrel power connector 104A may be capable of receiving power from an external power source. Ports 104B-C may couple to external devices such as USB-C flash memory 110, external hard drive 106, USB-C power adaptor 108, an external battery, an external keyboard, an external mouse, a USB key, or other external device. For example, the information handling system 100 may receive power from AC wall outlet 114 through USB-C power adaptor 108 coupled between AC wall output 114 and port 104B. Simultaneously, the system 100 may deliver power to external hard drive 106 coupled to port 104C. Alternatively, USB-C ports 104B-C may each be coupled to external power sources, such as batteries or external AC power adaptors. Although only three ports are illustrated, the information handling system may transmit power to and receive power from additional devices coupled to the system through additional ports such as USB-C ports, barrel power connector ports, magnetic power ports, USB ports, Thunderbolt ports, and other kinds of ports. For example, multiple USB-C ports may be located on both the left and right sides of the information handling system 100. Each USB-C port may have a corresponding PD controller for controlling power received from and delivered to devices coupled to the USB-C port. Thus, an information handling system have multiple ports capable of receiving power from external devices.

Figure 2:
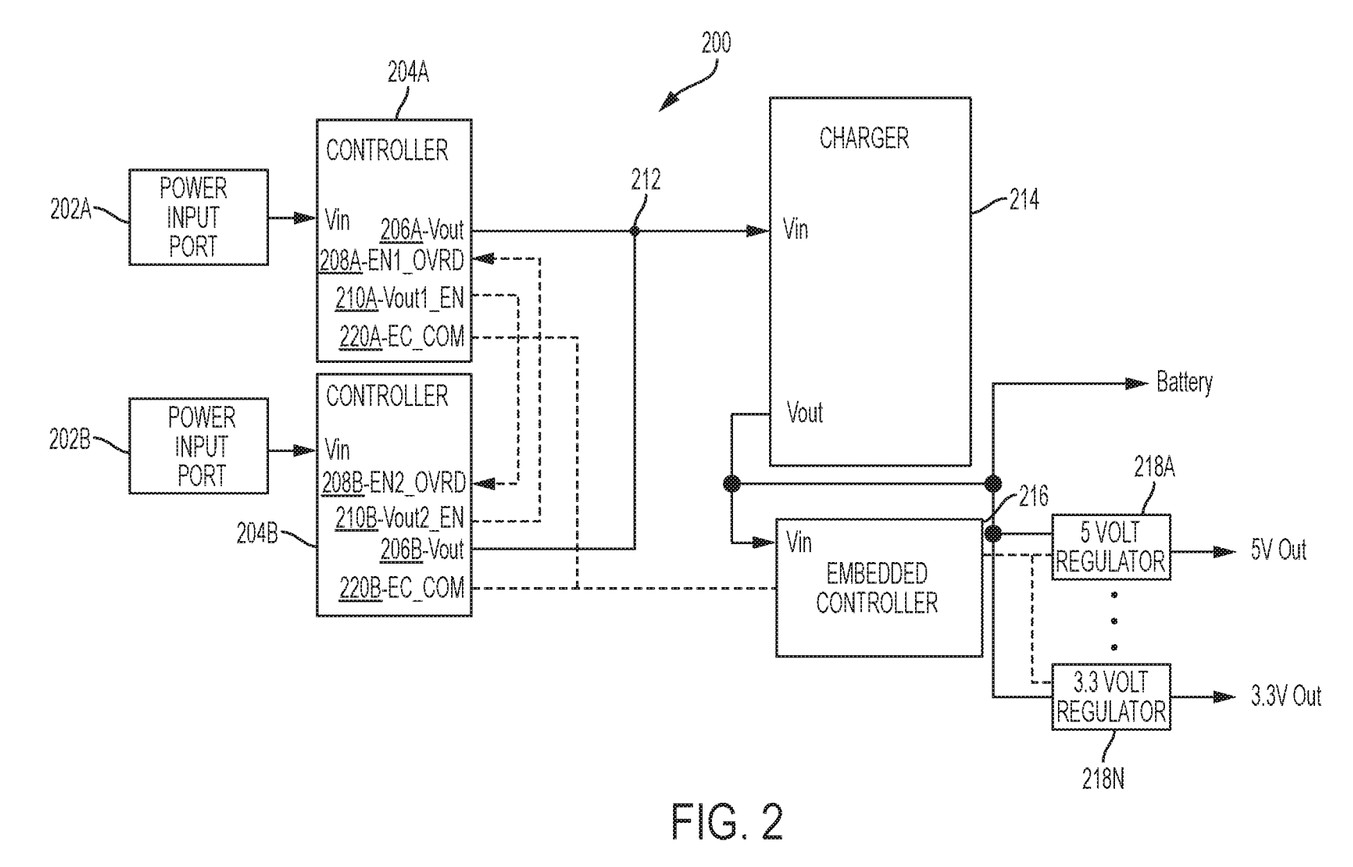
FIG. 2 is a circuit diagram of a power distribution system of an information handling system having two ports capable of receiving power according to some embodiments of the disclosure.

An information handling system power circuit 200 of FIG. 2 may include multiple power input ports 202A-B coupled to corresponding controllers 204A-B. The power input ports 202A-B may be capable of transmitting power and data to and receiving power and data from connected devices. For example, the power input ports 202A-B may be USB ports, such as USB-C ports, barrel jack DC input ports, thunderbolt ports, or other ports capable of receiving power from external devices. The controllers 204A-B control power received from and/or provided to external devices coupled to the power input ports 202A-B. For example, each controller 204A-B may be configured to control power received from external devices coupled to its respective power input port 202A-B when the system is starting up and may determine whether to allow power to flow through the power input port 202A-B to provide power to system components, such as embedded controller 216, while they boot. For example, controllers 204A-B may include internal metal-oxide semiconductor field-effect transistors (MOSFETS) or other power transistors and may control the MOSFETS to control power flow through power input ports 202A-B. In other embodiments, the controllers 204A-B may control external MOSFETS or other transistors to control power flow through the power input ports 202A-B. The system may include additional power paths (not pictured) for supplying power to the system from devices coupled to power input ports 202A-B after the system has booted. The controllers 204A-B may output power from voltage outputs 206A-B to a common power node 212. The common power node 212 may be coupled to a charger 214 to charge a system battery, to supply power to voltage regulators, such as voltage regulators 218A-N, to supply power to an embedded controller 216 of the system, and to supply power to other information handling system components. The charger 214 may output power to an embedded controller 216 and to voltage regulators 218 A-N such as 5V voltage regulator 218A, 3.3 V voltage regulator 218N, and other voltage regulators. The charger 214 may also provide power to a battery of the system 200. The embedded controller 216 may be a system power controller for controlling power within the information handling system. In some embodiments, the embedded controller 216, once booted, may communicate with controllers 204A-B, through embedded controller communication pins 220A and 220B, respectively, to control power received from one or more external power sources coupled to power input ports 202A-B. For example, embedded controller 216 may be a flash-less controller and may require a peripheral control hub (PCH) (not shown) to power up before it can load its firmware. Thus, the embedded controller 216 may be unable to control power received from power input ports 202A-B until it has booted. In some embodiments, the charger 214 may trigger a state machine in the embedded controller 216 to cause voltage regulators 218A-N such as 5V voltage regulator 218A and 3.3V voltage regulator 218N to regulate voltage supplied to the information handling system, such as voltage supplied to the embedded controller 216 and to a PCH (not shown) for booting the embedded controller 216. The voltage regulators 218A-N may supply power to controllers 204A-B, and, in some embodiments, to the embedded controller 216.

Power input port 202A and controller 204A may be located on an opposite side of an information handling system from power input port 202B and controller 204B. Placing the power input ports 202A-B at different locations in an information handling system can improve usability by allowing more flexibility in coupling external devices to the power input ports. However, each of the controllers 204A-B may not automatically know the status of the power input port that it is not directly coupled to. For example, while an information handling system is booting, an embedded controller responsible for controlling power in the information handling system, such as embedded controller 216 may not have fully booted and thus may not be able to control power received from one or more external power sources coupled to power input ports 202A-B. Other devices may control power delivered from external power sources coupled to power input ports 202A-B to prevent power from flowing from the external power sources into the information handling system simultaneously, in particular to control power delivered while system components, such as embedded controller 216, are booting. Instead of including external initial power control circuitry or logic for controlling power supplied to the information handling system while control components are booting, which can increase device form factor, power consumption and cost, the controllers 204A-B for the power input ports 202A-B may be coupled together. Thus, cross-conduction or reverse current flow across the power input ports 202A-B during booting may be prevented while avoiding substantial increases in device form factor and cost.

Controllers 204A-B may be PD controllers for controlling power delivered to and from devices coupled to the power input ports 202A-B. Controllers 204A-B may be coupled together to control power received from external devices coupled to power input ports 202A-B. Controller 204A may include a voltage output indicator 210A for indicating that power is, or soon will be, provided to the information handling system through controller 204A from a power supply coupled to power input port 202A. Controller 204B may also include a voltage output indicator 204B for indicating that power is, or soon will be, provided to the information handling system through controller 204B from a power supply coupled to power input port 202B. Each controller 204A-B may be configured to apply a voltage to its voltage output indicator 210A-B when an external power source is detected coupled to its respective power input port 202A-B. Each voltage output indicator 210A-B may be coupled to the voltage output override indicator 208A-B of the other controller. When a controller detects a voltage at its voltage output override indicator, it may block power from being supplied to the information handling system from a power source coupled to its power input port. Thus, if controller 204A detects an external power source coupled to power input port 202A, it may apply a voltage to voltage output indicator 210A. Controller 204B may then detect a voltage at voltage output override indicator 208B and may block power from flowing through controller 204B to the information handling system from a power source coupled to power input port 202B. Voltage output indicators 210A-B and voltage output override indicators 208A-B may, for example, be pins of controllers 204A-B, such as general-purpose input/output (GPIO) pins, configured to serve as voltage output indicators and voltage output override indicators respectively. Thus, controllers 204A-B may be configured to prevent power from being supplied to the information handling system from multiple power sources coupled to power input ports 202A-B simultaneously.

Some information handling systems may be equipped with more than two power input ports capable of receiving power from external power supplies. Controllers of the power input ports in such systems may be configured to accept power from a single external power supply coupled to a power input port, while blocking power received from additional external power supplies. For example, an information handling system power circuit 300, shown in FIG. 3, may include three power input ports 302A-C, each coupled to one of three corresponding controllers 304A-C. The controllers 304A-C may be configured to control power received from and supplied to devices coupled to their respective power input ports, similar to controllers 204A-B of FIG. 2. The controllers 304A-B may output power from voltage outputs 306A-C to a common power node 312. The common power node 312 may be coupled to a charger 314 to charge a system battery, to supply power to voltage regulators, such as voltage regulators 318A-N, to supply power to an embedded controller 316 of the system, and to supply power to other information handling system components. The charger 314 may output power to an embedded controller 316, to voltage regulators 318A-N, and to a battery of the information handling system, similar to embedded controller 216 described with respect to FIG. 2. In some embodiments, the charger 314 may trigger a state machine in the embedded controller 316 to cause voltage regulators 318A-N such as 5V voltage regulator 318A and 3.3V voltage regulator 318N to regulate voltage supplied to the information handling system, such as voltage supplied to the embedded controller 316 and to a PCH (not shown) for booting the embedded controller 316. The voltage regulators 318A-N may supply power to controllers 304A-C, and, in some embodiments, to the embedded controller 316. In some embodiments, the embedded controller 316, once booted, may communicate with controllers 304A-C, through embedded controller communication pins 320A-C, respectively, to control power received from one or more external power sources coupled to power input ports 302A-C.

Figure 3:
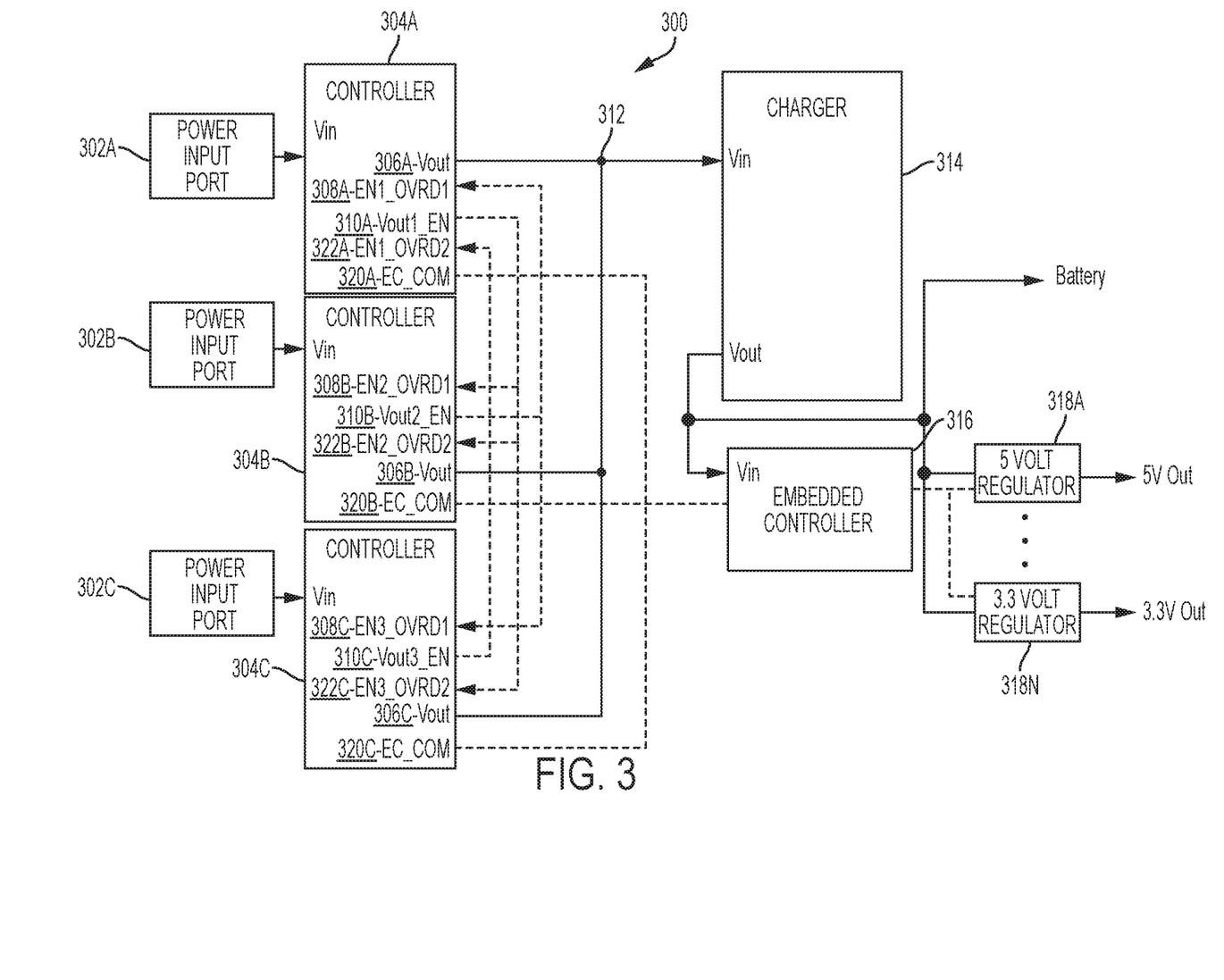
FIG. 3 is a circuit diagram of a power distribution system of an information handling system having three ports capable of receiving power according to some embodiments of the disclosure.

The controllers 304A-C may be coupled together to control power supplied to the information handling system from external devices coupled to power input ports 302A-C similar to controllers 204A-B of FIG. 2. When one of controllers 304A-C detects an external power supply coupled to its corresponding power input port, the controller may communicate with the remaining controllers to block power received from external power supplies coupled to their respective power input ports. Each of controllers 304A-C may include first voltage output override indicators 308A-C and second voltage output override indicators 322A-C, as opposed to the single voltage output override indicators 208A-B of controllers 204A-B of FIG. 2. Thus, each controller may prevent the other two controllers from outputting power from an external power supply when it detects an external power source coupled to its power input port. For example, controller 304A may include a voltage output indicator 310A to which a voltage is applied when controller 304A detects an external power source coupled to power input port 302A. Voltage output indicator 310A may be coupled to voltage output override indicator 308B of controller 304B and voltage output override indicator 322C of controller 304C. Thus, when a voltage is applied to voltage output indicator 310A, controller 304B may detect a voltage at voltage output override indicator 308B and prevent power from flowing from an external power source coupled to power input port 302B and controller 304C may detect a voltage at voltage output override indicator 322C and prevent power from flowing from an external power source coupled to power input port 302C to the information handling system. Likewise, when controller 304B detects an external power source coupled to power input port 302B it may apply a voltage to voltage output indicator 310B which may be coupled to voltage output override indicator 308A of controller 304A and voltage output override indicator 308C of controller 304C. When controller 304C detects an external power source coupled to power input port 302C, it may apply a voltage to voltage output indicator 310C, which may be coupled to voltage output override indicator 322A of controller 304A and voltage output override indicator 322B of controller 304B. As an alternative to the use of additional voltage output override indicators in controllers 304A-C, an external logic circuit (not shown) may couple a voltage output from any of voltage output indicators 310A-C to voltage output override indicators of the other controllers. In some embodiments, each of the controllers 304A-C may have a single voltage override indicator pin, which may be connected to the voltage output indicator pins of the other two controllers. In some embodiments, the controllers 304A-C may be daisy-chained. When a daisy-chained controller detects a voltage at a voltage output override indicator the controller may apply a voltage to an indicator coupled to a voltage output override indicator of the next controller in the chain. This passing of the indicator prevents controllers from supplying power from an external power supply to the system when power is already being supplied from a different external power supply. In other embodiments, the controllers 304A-C may be configured in a master-slave configuration so that a single controller determines which external power supply will supply power to the system, or a priority configuration, so that if a power supply is coupled to a higher priority port all other ports will block power while the higher priority port allows power to flow from the external power supply to the system. In still other embodiments, the controllers 304A-C may be configured in a star topology, with a single controller acting as a hub. When the hub controller receives a voltage output indicator signal, it may route the signal to the voltage output override indicators of the remaining controllers. The routing of the signal prevents controllers from supplying power from an external power supply to the system when power is already being supplied from a different external power supply. Thus, controllers in a circuit with more than two power input ports capable of receiving power from external power supplies may accept power from a single power supply at a single power input port while preventing power from flowing to the information handling system from any additional power supplies coupled to the other power input ports.

Figure 4:
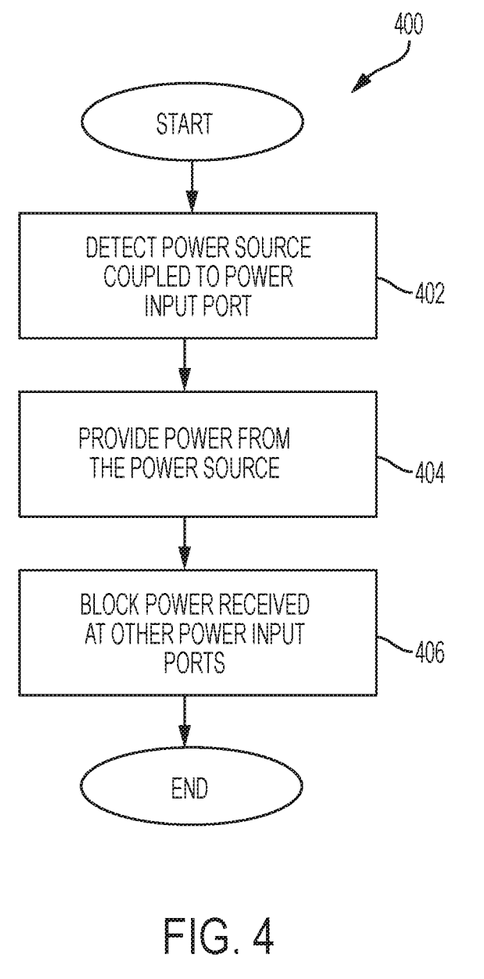
FIG. 4 is a flow chart of an example method for controlling power received from an external power source according to some embodiments of the disclosure.

An information handling system with multiple power input ports may accept power from an external power source coupled to a single power input port while blocking power from any additional external power supplies coupled to power input ports. In particular, while an information handling system is booting, PD controllers of the power input ports may be coupled together to ensure that power is accepted from a single external power supply while the system is booting. An example method 400 for controlling power supplied to an information handling system is shown in FIG. 4. The method 400 may begin with detecting a power source coupled to a power input port. For example, a controller of a power input port, such as a PD controller of a USB-C port, may detect a power source, such as an external battery or an external AC power adaptor, coupled to the power input port. Power may be provided, at step 404, from the external power source to the information handling system. For example, the PD controller coupled to the power input port may allow power to flow through the controller to one or more components of the information handling system. In some embodiments, the PD controller may provide a minimum level of power necessary for one or more additional power control components of the information handling system, such as one or more embedded controllers, to boot. The additional power control components may then assume control of power delivered from the external power source to the system and may allow an amount of power necessary for full system operation to be provided. Power from any additional external power sources coupled to power input ports may be blocked, at step 406, from being provided to the information handling system. For example, the controller of the power input port coupled to the external power source delivering power to the system may instruct the controllers of the remaining power input ports to block power from being supplied to the system from external power sources coupled thereto. Thus, power may be accepted from a single external power source while blocking power from any additional external power sources coupled to the system.

Figure 5:
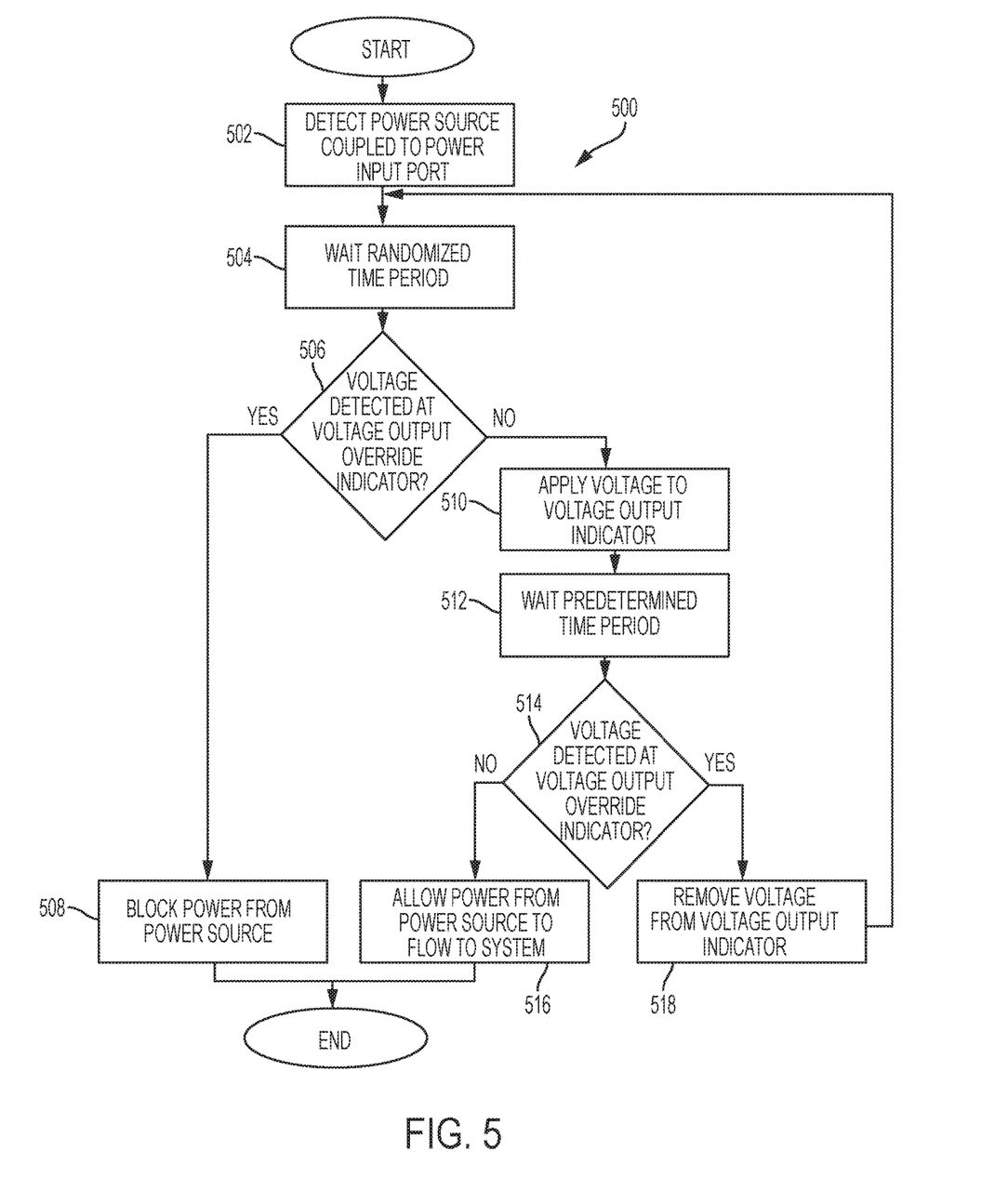
FIG. 5 is a flow chart of an example method for controlling power received from an external power source according to some embodiments of the disclosure.

In some cases, an information handling system may detect multiple external power sources coupled to power input ports at the same time. Thus, the system must be able to select a single power supply to supply power while blocking power from the remaining additional power supplies. A method 500 for controlling power supplied to an information handling system from one or more external power supplies is shown in FIG. 5. The method may begin, at step 502, with detecting a power source coupled to a power input port. For example, as described above, a PD controller may detect an external power supply coupled to a USB-C port. The system may then wait a randomized period of time, at step 504, before proceeding. The randomized period of time can help to prevent conflicts between PD controllers if multiple PD controllers performing the method 500 detect power supplies coupled to their respective power input ports simultaneously. When the randomized period of time has passed, a determination may be made, at step 506, of whether a voltage has been detected at a voltage output override indicator indicating that another power supply coupled to another power input port of the information handling system currently is, or soon will be, providing power to the system. If a voltage is detected at a voltage output override indicator, at step 506, power may be blocked, at step 508, from flowing from the external power source to the information handling system. For example, the PD controller may block power from flowing from the external power source coupled to the power input port to the information handling system to prevent power from flowing into the system from multiple power sources simultaneously.

If a voltage is not detected at a voltage output override indicator, at step 506, a voltage may be applied, at step 510, to a voltage output indicator. For example, the PD controller may apply a voltage to a voltage output indicator pin of the PD controller to inform other controllers of the system that an external power supply coupled to its associated power input port will soon be supplying power to the system and to cause the other controllers to prevent power supplies coupled thereto from supplying power to the system. The system may then wait a predetermined period of time, at step 512, before proceeding with the method. Alternatively, the PD controller may determine and wait a randomized period of time after applying the voltage to its voltage output indicator at step 510. The delay at step 512 can prevent conflicts that may arise if multiple PD controllers were to detect power supplies coupled to their respective power input ports and simultaneously apply voltages to their respective voltage override indicators. For example, if two power supplies coupled to two power input ports of an information handling system were plugged into a single power strip, and the power strip was subsequently turned on, the system may detect external power supplies at both power input ports simultaneously. After waiting the predetermined period of time, at step 512, a determination may be made, at step 514, of whether a voltage is detected at a voltage output override indicator. For example, the PD controller may determine whether it detects a voltage at its voltage output override indicator pin indicating that there is another PD controller about to supply power to the system from a power source coupled to its associated power input port.

If a voltage is not detected at a voltage output override indicator at step 514, the system may allow power to flow from the power source to the information handling system. For example, the PD controller may determine that power is not being supplied from another power source coupled to another power input port of the information handling system and may allow power to flow from the power source coupled to its associated power input port to the system. In some embodiments, the PD controller may allow a minimum amount of power to flow from the power source to boot system components, such as an embedded controller. For example, the PD controller may allow a minimum amount of power to flow from the power source to operate system components used to boot the embedded controller, such as voltage regulators, a PCH, and other system components used in booting the embedded controller. A PD controller, such as controller 204A of FIG. 2, may negotiate a minimum AC power with the external power supply to supply the power to system components, such as an embedded controller and other components used in booting the embedded controller, such as a PCH. After an embedded controller has booted, it may negotiate power with the power source to supply power sufficient for operating the entire information handling system.

If a voltage is detected at a voltage output override indicator at step 514, the voltage may be removed, at step 518, from the voltage output indicator. For example, the PD controller may detect a voltage at its voltage output override indicator while applying a voltage to its voltage output indicator, indicating that another PD controller is about to supply power to the information handling system from another external power source. The PD controller will then remove the voltage from its voltage output indicator and refrain from supplying power from the power source coupled to its associated power input port. The other PD controller will also remove the voltage from its voltage output indicator and refrain from supplying power to the information handling system from the power source coupled to its associated power input port. The method may then proceed to step 504 where a randomized period of time will pass before proceeding. The randomized period of time can help prevent a repeated conflict between the PD controller and any other PD controller that caused a voltage to be detected at step 514. Thus, conflicts will be resolved and power will be supplied to the information handling system from a single external power supply.

Figure 6:
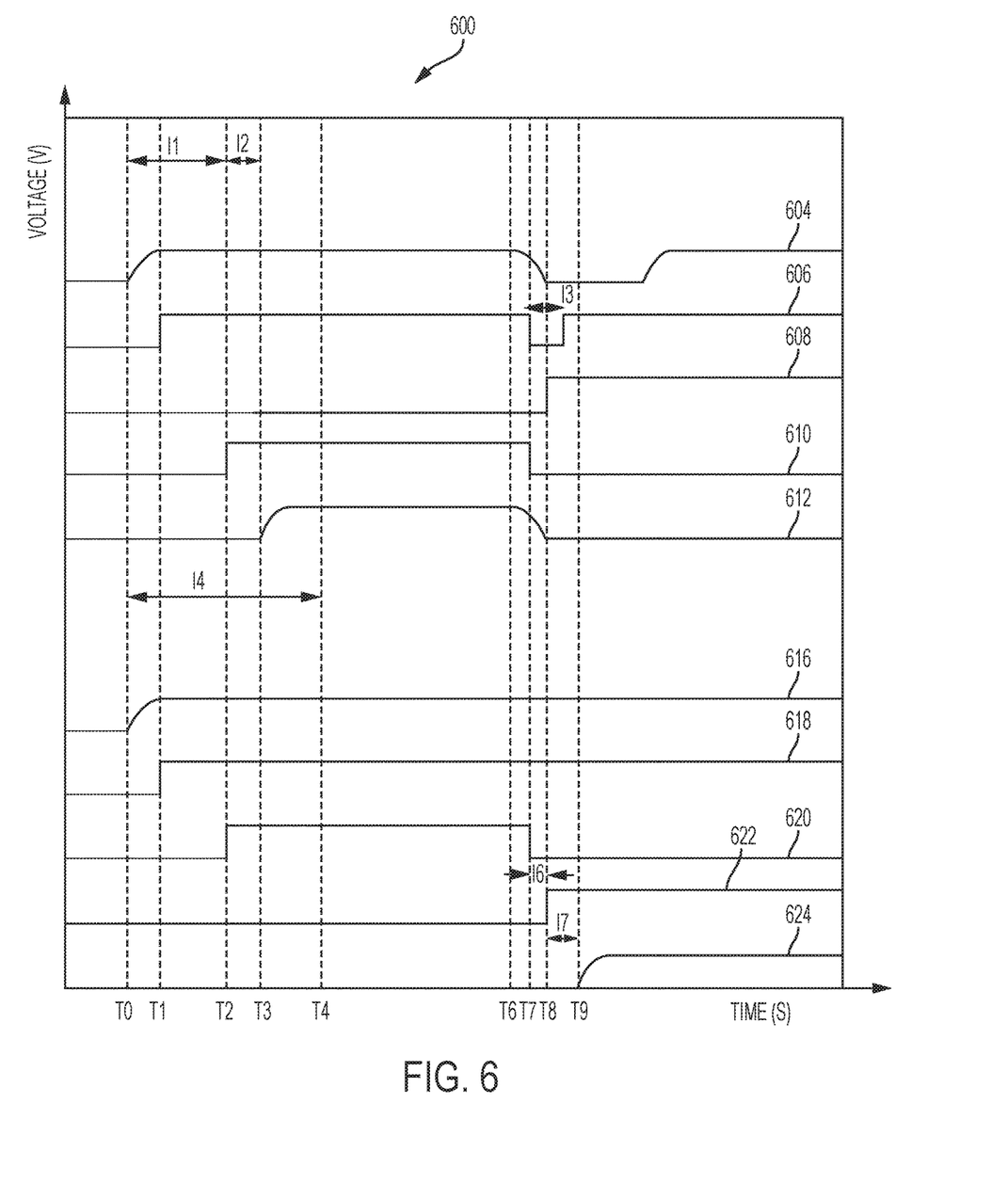
FIG. 6 is an example timing diagram for controlling a plurality of power input ports coupled to power sources according to some embodiments of the disclosure.

The timing of the operation of the controllers of the power input ports may be orchestrated to prevent power from being supplied from multiple external power sources to the information handling system simultaneously. Timing diagram 600, of FIG. 6, illustrates example timing of power in a system where two external power supplies are coupled to power input ports of an information handling system. Line 604 represents a voltage detected by a first controller, such as a PD controller, at the first power input port. At time T0, a voltage is detected by the first controller. The first controller may detect the increase of voltage at the first power input port, shown by line 604, at time T0. An AC disconnect output voltage of the controller, shown by line 606, may increase at time T1, in response to the detected increase in voltage at the first power input port, indicating that an AC adaptor has been connected. The first controller may wait for a time interval I1 following detection of the voltage at the first power input port, at time T0. The time interval I1 may be a randomized time interval, as described above. When the time interval I1 has passed, the first controller may apply a voltage to a voltage output indicator, represented by line 610, at time T2. The first controller may then wait a time interval I2 following the application of the voltage to the voltage output indicator. Interval I2 may be a set predetermined time interval. Following interval I2, at time T3, the first controller may output a voltage, represented by line 612, from the first external power source coupled to the first power input port to the information handling system.

At the same time, T0, a second external power supply coupled to a second power input port of the information handling system may be activated. A second controller controlling the second power input port may detect an increase in voltage at the second power input port, illustrated by line 616, from the second external power supply at time T0. An AC disconnect output voltage of the second controller, shown by line 618, may increase at time T1. The second controller may then wait a time interval I4, which may be randomized. The time interval I4 for the second controller may be longer than the time interval I1 for the first controller. The increase in the voltage of the voltage output indicator of the first controller, shown by line 610, at time T2 will cause an increase in the voltage at a voltage output override indicator of the second controller, shown by line 620, at the same time. The increased voltage on the voltage output override indicator of the second controller will cause the second controller to refrain from increasing the voltage of its voltage output indicator, shown by line 622, at time T4, as it will be detected by the second controller before the time interval I4 between T0 and T4 has passed. Thus, the voltage output from the second controller, shown by line 624, will remain at zero, at time T4, because the second controller will detect that the first controller is already outputting voltage to power the information handling system.

The system may disconnect the first power source, for example, to switch to accepting power from the second power source. For example, at time T6, an input may be received by the system to disable or reset the first external power source. For example, the first external power source may be decoupled from the first power input port. When the input for disabling the first external power source is detected, the AC disconnect output voltage of the first controller, shown by line 606, may decrease at time T7. The AC disconnect output voltage for the first power input port may remain low for an interval I3 before returning to a high voltage. The voltage detected by the first controller at the first power input port may decrease to a low voltage at time T6 and may remain low for a period of time before returning to a high voltage. At time T7, the first controller may detect that the voltage at the first power input port is low and may reduce the voltage at the voltage output indicator of the first controller, shown by line 610, and may also reduce the voltage output from the first controller, shown by line 610.

Meanwhile, the second controller may detect that the voltage at its voltage output override indicator, shown by line 620, has decreased, as a result of the decrease in the voltage of the voltage output indicator of the first controller, shown by line 610. The second controller may then wait a time interval I6, which may be randomized, before increasing the voltage of the voltage output indicator of the second controller, shown by line 622, at time T8. The increase of the voltage of the voltage output indicator of the second controller, shown by line 622, will cause the voltage of the voltage output override indicator of the first controller, shown by line 608, to increase at time T8, thereby preventing the first controller from allowing power to flow from the first external power source to the system when the voltage at the first power input port, shown by line 604, has returned to a high level. The second controller may then wait a time interval I7, following application of the voltage to the voltage output indicator of the second controller, shown by line 622, before outputting a voltage from the second external power source coupled to the second power input port to the information handling system at time T9, as shown by line 624.

Figure 7:
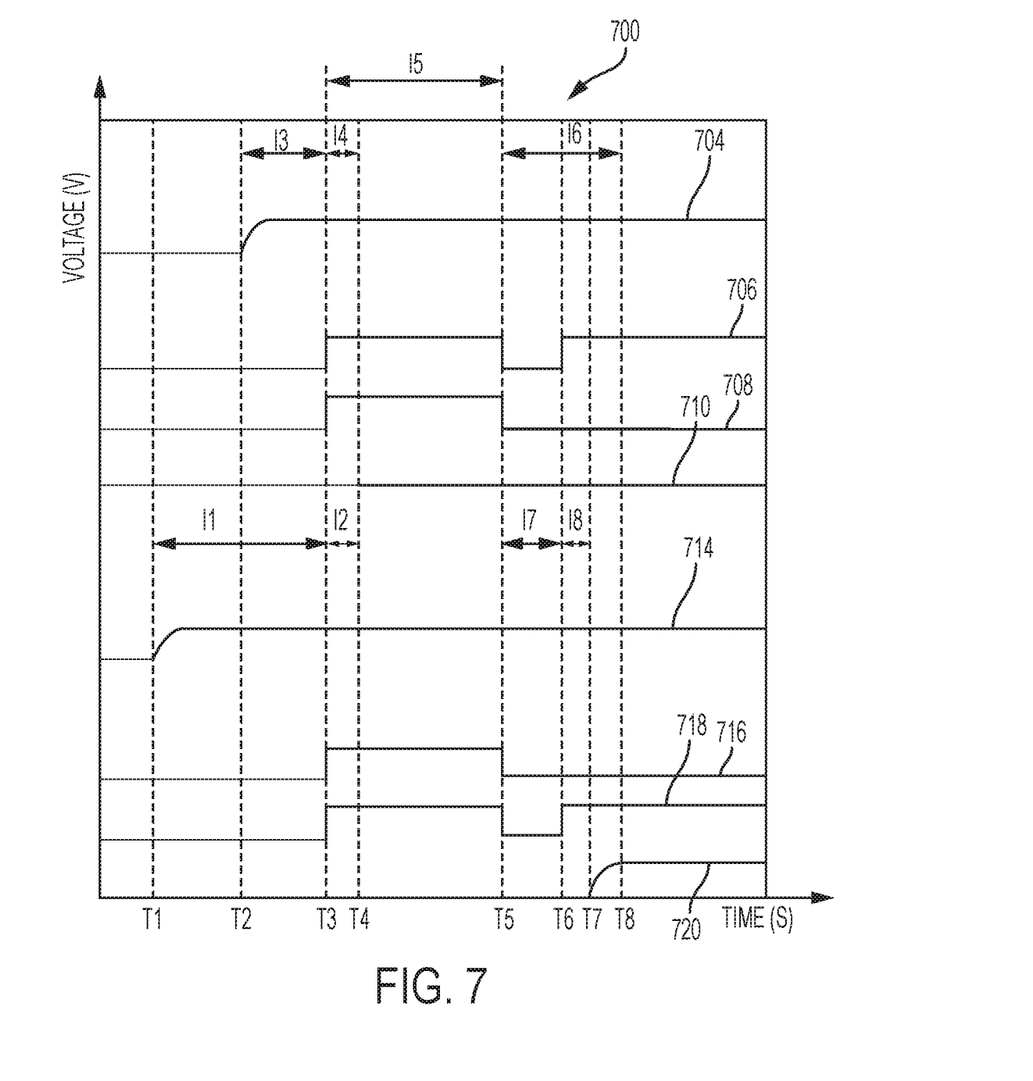
FIG. 7 is an example timing diagram for controlling a plurality of power input ports coupled to power sources according to some embodiments of the disclosure.

In some embodiments, multiple controllers may apply a voltage to their voltage output enable indicators simultaneously, as illustrated in timing diagram 700 of FIG. 7. Line 714 represents a voltage detected by a first controller, such as a PD controller, at the first power input port. At time T0, a voltage is detected by a first controller. Thus, the controller may detect the increase of voltage at the first power input port, shown by line 714, caused by the activation of the external power supply, at time T0. The first controller may wait for a time interval I1 following detection of the voltage at the first power input port, at time T0, prior to applying a voltage to a voltage output indicator, shown by line 718. The time interval I1 may be a randomized time interval, as described above. When the time interval I1 has passed, the first controller may apply a voltage to a voltage output indicator, represented by line 718, at time T3. The controller may then wait a time interval I2, from time T3 to time T4, which may be a predetermined time interval, following the application of the voltage to the voltage output indicator.

At the same time a second controller may be going through the process of enabling power received from a second power source. For example, at time T2, a second external power supply may be activated causing a voltage at a second power input port to which the second external power supply is coupled, shown by line 704, to increase. The second controller may wait for a time interval I3, which may be randomized. The time interval I3 may be different from the time interval I1, but both time intervals may end at the same time T3. When the time interval I3 has passed, the second controller may apply a voltage to a voltage output indicator, shown by line 708. The second controller may then wait a time interval I4, from time T3 to time T4, which may be a predetermined time interval, following the application of the voltage to the voltage output indicator.

The first controller and the second controller may each apply voltages to their respective voltage output indicators simultaneously, at time T3. At the same time, the first controller may detect an increase of a voltage at its voltage output override indicator, shown by line 716, caused by the increase in the voltage at the second controller's voltage output indicator. Likewise, the second controller may detect an increase of a voltage at its voltage output override indicator, shown by line 706, caused by the increase in the voltage at the first controller's voltage output indicator. Thus, both controllers may detect voltages at their voltage output override indicators prior to allowing power to flow into the system. To prevent power from being supplied to the system from both controllers, the power output from the first power supply through the first controller will remain at 0, as shown by line 720, and the power output from the second power supply through the second controller will remain at 0, as shown by line 710. After a time interval I5, the controllers may cease applying voltage to their respective voltage output indicators, as illustrated by lines 718 and 708, at time T5. Each controller may then generate a new, possibly random, time interval to wait prior to reapplying a voltage to their respective voltage output indicators. The second controller's newly generated time interval 16, from time T5 to time T8, is longer than the first controller's newly generated time interval 17, from time T5 to time T6. Thus, the first controller will allow the time interval 17 to pass, before increasing a voltage at its voltage output indicator at time T6, as shown by line 718. The increase in voltage at the voltage output indicator of the first controller, will cause the voltage at the voltage output override indicator of the second controller, shown by line 706, to increase at time T6 as well. The second controller will refrain from supplying power from the second external power supply to the information handling system and the voltage output from the second controller, shown by line 710, will remain at zero. The first controller will wait a time interval 18, which may be equal to time intervals 12 and 14, before allowing power to flow through the second controller to the information handling system. At time T7, the first controller will allow power to flow from the first power source to the information handling system and voltage at the output of the second controller, shown by line 720, will increase. Thus, when two controllers controlling power input ports coupled to external power sources apply voltages to their voltage output indicators simultaneously, the controllers can wait randomized periods of time before trying again, thus allowing a single power source to supply power to the information handling system.

Figure 8:
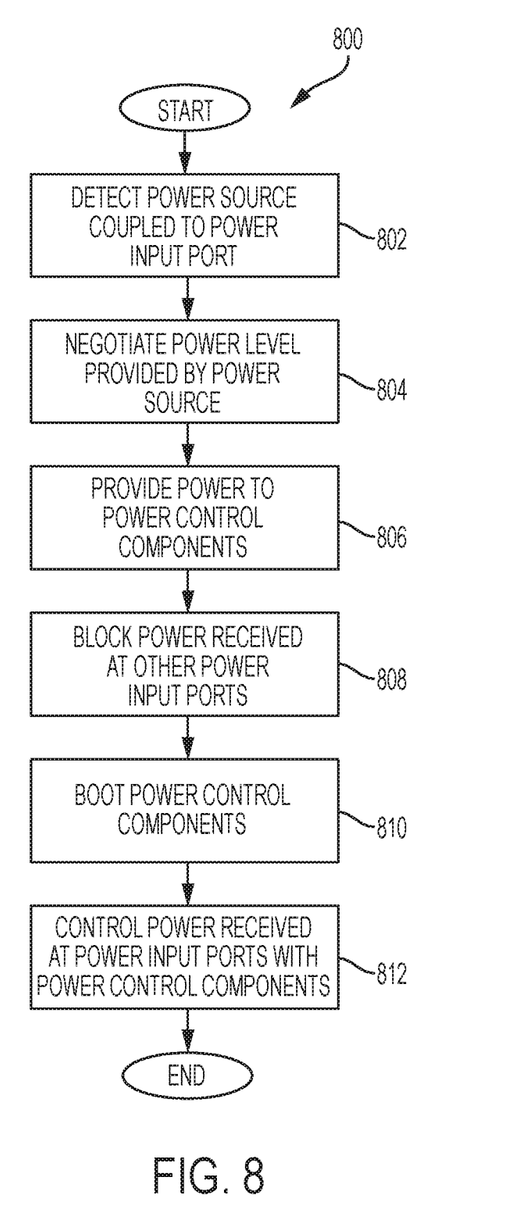
FIG. 8 is a flow chart of an example method for controlling power received from an external power supply when booting one or more power control components according to some embodiments of the disclosure.

Power supplied to an information handling system from one or more external devices can also be controlled when one or more power control components are not initialized, as illustrated in FIG. 8. A method 800 for controlling power supplied to an information handling system while one or more power control components are not initialized may begin with detection of a power source coupled to a power input port, at step 802. An information handling system may be in a powered down state and a controller, such as a power delivery controller of the power input port, may detect an external power source coupled thereto. Power control components of the system, such as an embedded controller may be powered down, as described with respect to FIG. 2. For example, a flash-less embedded controller may require a peripheral control hub (PCH) to power up, allowing the embedded controller to load firmware from a serial peripheral interface bus (SPI) read only memory (ROM) attached to the PCH, before it can load its firmware and assume control of power received at the power input ports of the information handling system.

At step 804, the controller may negotiate a power level provided by the power source. For example, the controller may negotiate a power level, such as a voltage and/or current, sufficient to boot one or more power control components of the system, such as an embedded controller and/or a peripheral control hub for controlling power delivered to the information handling system.

At step 806, the controller may provide power from the external power supply to the one or more power control components. For example, the external power supply may provide power at the negotiated power level at the power input port, and the controller may allow the power to flow from the power input port to the one or more power control components.

At step 808, the controller may block power received at other power input ports, as described with respect to FIGS. 4 and 5. For example, the controller may direct other controllers of other power input ports to prevent power from being supplied from external power supplies coupled to their respective power input ports.

At step 810, the one or more power control components may boot. For example, an embedded controller for controlling power in the information handling system and a PCH may receive the power from the external power supply, and the embedded controller may power up and load its firmware through the PCH.

When the one or more power control components have booted, they may, at step 812, control power received at power input ports of the information handling system. For example, an embedded controller may assume control of power received at power input ports of the information handling system. The embedded controller may negotiate a different power level to be received from external power supplies. For example, the embedded controller may negotiate supply of power at a power level sufficient to fully power the information handling system. The embedded controller may select a different power supply coupled to a different power input port from which to receive power into the information handling system. In some embodiments, the embedded controller may control power received at the power input ports of the information handling system through power delivery controllers coupled to the power input ports. Controllers, such as power delivery controllers, of power input ports may control power received from external devices coupled to the power input ports of an information handling system until power control components, such as an embedded controller, have booted.

The schematic flow chart diagram of FIGS. 4-5 and 8 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An information handling system, comprising:
   a first power input port;
   a second power input port;
   a first controller coupled to the first power input port;
   a second controller coupled to the second power input port; and
   a charger coupled to a power output of the first controller and a power output of the second controller,
   wherein the first controller is configured to block power received at the first power input port from entering the system when the system is receiving power from a power source coupled to the second power input port, and
   wherein the second controller is configured to block power received at the second power input port from entering the system when the system is receiving power from a power source coupled to the first power input port.

2. The information handling system of claim 1, further comprising:
   a third power input port; and
   a third controller coupled to the third power input port,
   wherein the third controller is configured to block power received at the third power input port from entering the system when the system is receiving power from a power source coupled to either the first power input port or the second power input port,
   wherein the first controller is further configured block power received at the first power input port when the system is receiving power from a power source coupled to the third power input port, and
   wherein the second controller is further configured to block power received at the second power input port when the system is receiving power from a power source coupled to the third power input port.

3. The information handling system of claim 1, wherein the first controller is configured to block power received at the first power input port by toggling a first switch to prevent current from flowing into the system via the first power input port, and wherein the second controller is configured to block power received at the second power input port by toggling a second switch to prevent current from flowing into the system via the second power input port.

4. The information handling system of claim 1, wherein the first and second power input ports are universal serial bus (USB) type-C ports.

5. The information handling system of claim 1, wherein a voltage output indicator of the first controller is coupled to a voltage output override indicator of the second controller and a voltage output indicator of the second controller is coupled to a voltage output override indicator of the first controller.

6. The information handling system of claim 5, wherein the first controller is configured to apply a voltage to the voltage output indicator of the first controller when a power source is detected coupled to the first power input port and to wait a predetermined period of time after applying the voltage before supplying power from the power source coupled to the first power input port to the information handling system.

7. The information handling system of claim 1, wherein the first and second controllers are further configured to provide a power level to boot one or more power control components of the information handling system, and wherein the first and second controllers are further configured to allow the one or more power control components to control power received at the first power input port and the second power input port after the power control components have booted.

8. The information handling system of claim 1, wherein the power source coupled to the first power input port comprises a first external power source and wherein the power source coupled to the second power input port comprises a second external power source.

9. A method, comprising:
   detecting, by a first controller, a power source coupled to a first power input port;
   providing, by the first controller, power from the power source coupled to the first power input port to a charger of an information handling system; and
   blocking, by a second controller, power received at a second power input port from entering the system while power is being provided to the information handling system from the power source coupled to first power input port,
   wherein the charger of the information handling system is coupled to a power output of the first controller and a power output of the second controller.

10. The method of claim 9, wherein the step of providing comprises:
    applying a voltage to a voltage output indicator of the first controller, coupled to a voltage output override indicator of the second controller; and
    allowing power to flow from the power source coupled to the first power input port to the information handling system after a predetermined period of time has passed following the application of voltage to the voltage output indicator.

11. The method of claim 10, wherein the step of providing further comprises:
    detecting a voltage at a voltage output override indicator of the first controller while the voltage is applied to the voltage output indicator of the first controller but prior to the passage of the predetermined period of time;
    removing the voltage from the voltage output indicator of the first controller;

waiting a randomized period of time, determined by the first controller; and re-applying the voltage to the voltage output indicator of the first controller after the randomized period of time has passed.

12. The method of claim 9, wherein the step of blocking comprises:

detecting, by the second controller, a voltage at a voltage output override indicator of the second controller; and preventing power received at the second power input port from entering the information handling system via the second controller.

13. The method of claim 9, further comprising waiting a randomized period of time after detecting the power source at the first power input port prior to applying the voltage to the voltage output indicator.

14. The method of claim 9, wherein providing power from the first power input port to the information handling system comprises providing a power level to boot one or more power control components of the information handling system, further comprising:

controlling, with the one or more power control components, power received at the first power input port and the second power input port after the power control components have booted.

15. An information handling system, comprising:

a first controller configured to perform steps comprising:

detecting a power source coupled to a first power input port, directing a second controller, coupled to a second power input port, to block power received at the second power input port from entering the system while power is being provided to the information handling system from the power source coupled to the first power input port, and providing power from the power source coupled to the first power input port to a charger of the information handling system, wherein the charger of the information handling system is coupled to a power output of the first controller and a power output of the second controller.

16. The information handling system of claim 15, wherein the step of directing comprises:

applying a voltage to a voltage output indicator of the first controller, coupled to a voltage output override indicator of the second controller.

17. The information handling system of claim 16, wherein the first controller is configured to perform steps further comprising:

waiting for a predetermined period of time to elapse after applying the voltage to the voltage output indicator before providing power from the power source coupled to the first power input port to the information handling system.

18. The information handling system of claim 17, wherein the first controller is configured to perform steps further comprising:

detecting a voltage at a voltage output override indicator of the first controller while the voltage is applied to the voltage output indicator of the first controller but prior to the passage of the predetermined period of time;

removing the voltage from the voltage output indicator of the first controller;

waiting a randomized period of time, determined by the first controller; and re-applying the voltage to the voltage output indicator of the first controller after the randomized period of time has passed.

19. The information handling system of claim 15, wherein the first controller is further configured to perform a step of waiting a randomized period of time after detecting the power source coupled to the first power input port prior to directing the second controller to block power received at the second power input port.

20. The information handling system of claim 15, wherein the step of providing power from the power source coupled to the first power input port to the information handling system comprises providing a power level to boot one or more power control components of the information handling system, and wherein the first controller is further configured to allow the one or more power control components to control power received at the first power input port and the second power input port after the power control components have booted.

* * * * *